(12) United States Patent
Neveu et al.

(10) Patent No.: US 11,591,953 B2
(45) Date of Patent: Feb. 28, 2023

(54) METHOD FOR CONTROLLING HYDROGEN COMBUSTION IN A HYDROGEN INTERNAL COMBUSTING ENGINE

(71) Applicant: VOLVO TRUCK CORPORATION, Gothenburg (SE)

(72) Inventors: Jean-Marc Neveu, St Priest (FR); Lionel Simon, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/810,742

(22) Filed: Jul. 5, 2022

(65) Prior Publication Data
US 2023/0009443 A1 Jan. 12, 2023

(30) Foreign Application Priority Data
Jul. 6, 2021 (EP) ................................. 21184043

(51) Int. Cl.
*F02B 43/12* (2006.01)
*F02B 47/02* (2006.01)

(52) U.S. Cl.
CPC .............. *F02B 43/12* (2013.01); *F02B 47/02* (2013.01); *F02B 2275/14* (2013.01); *F02B 2275/16* (2013.01); *F02B 2710/026* (2013.01)

(58) Field of Classification Search
None
See application file for complete search history.

(56) References Cited

U.S. PATENT DOCUMENTS

| | | | |
|---|---|---|---|
| 3,983,882 | A | 10/1976 | Billings |
| 4,167,919 | A | 9/1979 | Woolley et al. |
| 2004/0003781 | A1 | 1/2004 | Yuki et al. |
| 2004/0221821 | A1 | 11/2004 | Taxon |

(Continued)

FOREIGN PATENT DOCUMENTS

| | | | | |
|---|---|---|---|---|
| CA | 2898105 C | * | 8/2020 | ............. F01P 11/00 |
| CN | 103597186 A | * | 2/2014 | ................ F01P 3/00 |

(Continued)

OTHER PUBLICATIONS

European Search Report dated Dec. 10, 2021 in corresponding European Patent Application No. 21184043.4, 4 pages.

*Primary Examiner* — George C Jin
*Assistant Examiner* — Teuta B Holbrook
(74) *Attorney, Agent, or Firm* — Venable LLP; Jeffri A. Kaminski

(57) ABSTRACT

A method for controlling hydrogen combustion in a hydrogen internal combustion engine system includes a combustion chamber linked to an intake port via an intake valve, the hydrogen internal combustion engine system comprising a piston slidably moving between a top dead center position and a bottom dead center position, characterized by the steps of: injecting water in liquid phase in the intake port when the piston is between 0 and 40 crank angle degrees before opening of the intake valve, injecting hydrogen after opening of the intake valve and when the piston is between 0 and 60 crank angle degrees after the top dead center position, stopping hydrogen injection when the piston is between 0 and 100 crank angle degrees before the bottom dead center position.

9 Claims, 2 Drawing Sheets

(56) References Cited

U.S. PATENT DOCUMENTS

2007/0272548 A1* 11/2007 Sutherland ......... F02M 21/0227
                                                                            205/349
2014/0102403 A1     4/2014 Yoshihara et al.
2014/0331642 A1   11/2014 Dearth et al.

FOREIGN PATENT DOCUMENTS

| | | | | | |
|---|---|---|---|---|---|
| CN | 112127993 | A | * | 12/2020 | ......... C01B 13/0248 |
| JP | 2006220075 | A | * | 8/2006 | |
| JP | 2016118109 | A | | 6/2016 | |
| JP | 2019534979 | A | | 12/2019 | |
| JP | 2022044553 | A | * | 3/2022 | |
| KR | 20190108368 | A | | 9/2019 | |

\* cited by examiner

METHOD FOR CONTROLLING HYDROGEN COMBUSTION IN A HYDROGEN INTERNAL COMBUSTING ENGINE

TECHNICAL FIELD

The invention relates to a method for controlling hydrogen combustion in an internal combustion engine using hydrogen as fuel.

The invention can be applied in heavy-duty vehicles, such as trucks, buses and construction equipment. Although the invention will be described with respect to a heavy-duty vehicle, the invention is not restricted to this particular vehicle, but may also be used in other vehicles such as passenger vehicles.

BACKGROUND

Internal combustion engines operate by way of burning a fuel such as diesel or gasoline, in the presence of an oxidant inside a combustion chamber. Therefore, the fuel is transformed into other chemical species or combustion products, such as carbon dioxide ($CO_2$), water ($H_2O$) and byproducts such as nitrogen oxides (NOx). Moreover, mechanical and thermal energy are produced. The chemical species or combustion products emitted are released as exhausts gases. In order to reduce NOx emissions, aftertreatment of the exhausts gases are necessary.

An internal combustion engine generally works in cycles comprising:
- an intake phase where the fuel is introduced in a combustion chamber,
- a compression phase where the fuel is compressed by a piston slidably moving between a top dead center position and a bottom dead center position,
- a combustion phase where the fuel is ignited, and
- an exhaust phase where burned gases are evacuated.

The vehicle industry is striving to reduce $CO_2$ and byproducts emissions. For this purpose, various alternatives to diesel and gasoline have been developed for energizing vehicles. One such alternative is the use of hydrogen as fuel. The chemical energy of the hydrogen reacting with air may be converted into mechanical energy in order to propel the vehicle.

More precisely, hydrogen and air are introduced separately, through intake ports, into the combustion chamber of the internal combustion engine. The chemical reaction mostly produce $H_2O$ at high-temperature and high-pressure. Exhaust gases are released through an exhaust port.

However, the use of hydrogen as a fuel inside a combustion engine present several issues. Hydrogen burns very easily, very fast and at high temperature. Therefore, ignition energy is very low and can induce abnormal combustion, like autoignition and knock, but also backfire from the combustion chamber to the intake ports.

To mitigate these main issues, it is known to operated under extremely lean conditions at air ratios far higher than $\lambda=2$ over a wide power range, so the level of NOx emissions is negligible. Even the crude exhaust has significantly lower concentrations of NOx in such a hydrogen-based operation in comparison with emissions of a hydrocarbon-based process following aftertreatment of the exhaust gases. Only if a relatively high power output is required it is necessary to make the fuel-air mixture richer in the range of $1 \leq \lambda \leq 2$, which then is associated with a drastic increase in NOx emissions and thus the need for aftertreatment of the exhaust gas. However, this solution is costly.

Another solution is to dilute hydrogen with exhaust gas using a so called exhaust gas recirculation (EGR) unit. But it is not easy to have a sufficient amount of EGR because of the risk of water condensation when cooling and the low enthalpy of the exhaust gases to drive the internal combustion engine. In addition, EGR requires an exhaust gas pumping system which reduces the overall efficiency of the internal combustion engine.

Another solution is to dilute hydrogen with water in liquid phase, in order to lower the temperature of the combustion products as well as the temperature of overheated parts. This solution avoid implementing an exhaust gas pumping system in the internal combustion engine. The water is instantly vaporized to steam by igniting hydrogen gas. In addition, this solution allows decreasing boost efforts by working on lower dilution than with EGR.

The invention is directed to a method for controlling hydrogen combustion in an internal combustion engine thanks to water injection.

SUMMARY

An object of the invention is to provide a method for controlling hydrogen combustion in a hydrogen internal combustion engine system, that solves at least the previous problem of the prior art.

By the provision of a method which comprises a sequence of injection of water and hydrogen, the hydrogen internal combustion engine system is less likely to present backfire, autoignition and knock. Moreover, NOx emissions and boost efforts are decreased.

According to one embodiment, the step of opening the intake valve is performed when the piston is between 10 crank angle degrees before the top dead center position and 40 crank angle degrees after the top dead center position.

According to one embodiment, the method further comprises the step of closing the intake valve when the piston is between 20 crank angle degrees before the bottom dead center position and 60 crank angle degrees after the bottom dead center position.

According to one embodiment, the method further comprises the step of stopping water injection when the piston is between 0 and 10 crank angle degrees before stopping hydrogen injection.

According to one embodiment, the step of injecting water comprises multi injection of water.

According to one embodiment, the step of injecting water is longer than the step of injection hydrogen.

According to one embodiment, the step of injecting hydrogen last less than 100 crank angle degrees.

According to one embodiment, hydrogen is indirectly injected in the combustion chamber through the intake port.

According to another embodiment, hydrogen is directly injected in the combustion chamber.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EMBODIMENTS OF THE INVENTION

Figure 1:
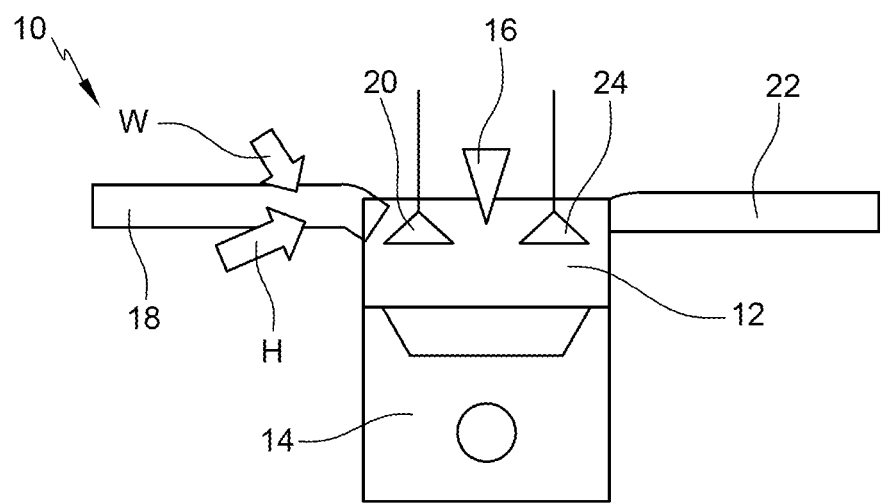
FIG. 1 is a schematic view of a part of a hydrogen internal combustion engine system illustrating indirect injection of hydrogen and water.

FIG. 1 illustrates a part of a hydrogen internal combustion engine system 10 comprising a combustion chamber 12 and a piston 14. The hydrogen internal combustion engine system 10 works in cycles comprising:
- an intake phase where hydrogen H is introduced in the combustion chamber 12,
- a compression phase where hydrogen H is compressed by the piston 14,
- a combustion phase where hydrogen H is ignited by an ignition plug 16 disposed in the combustion chamber, and
- an exhaust phase where burnt gases are evacuated.

Figure 2:
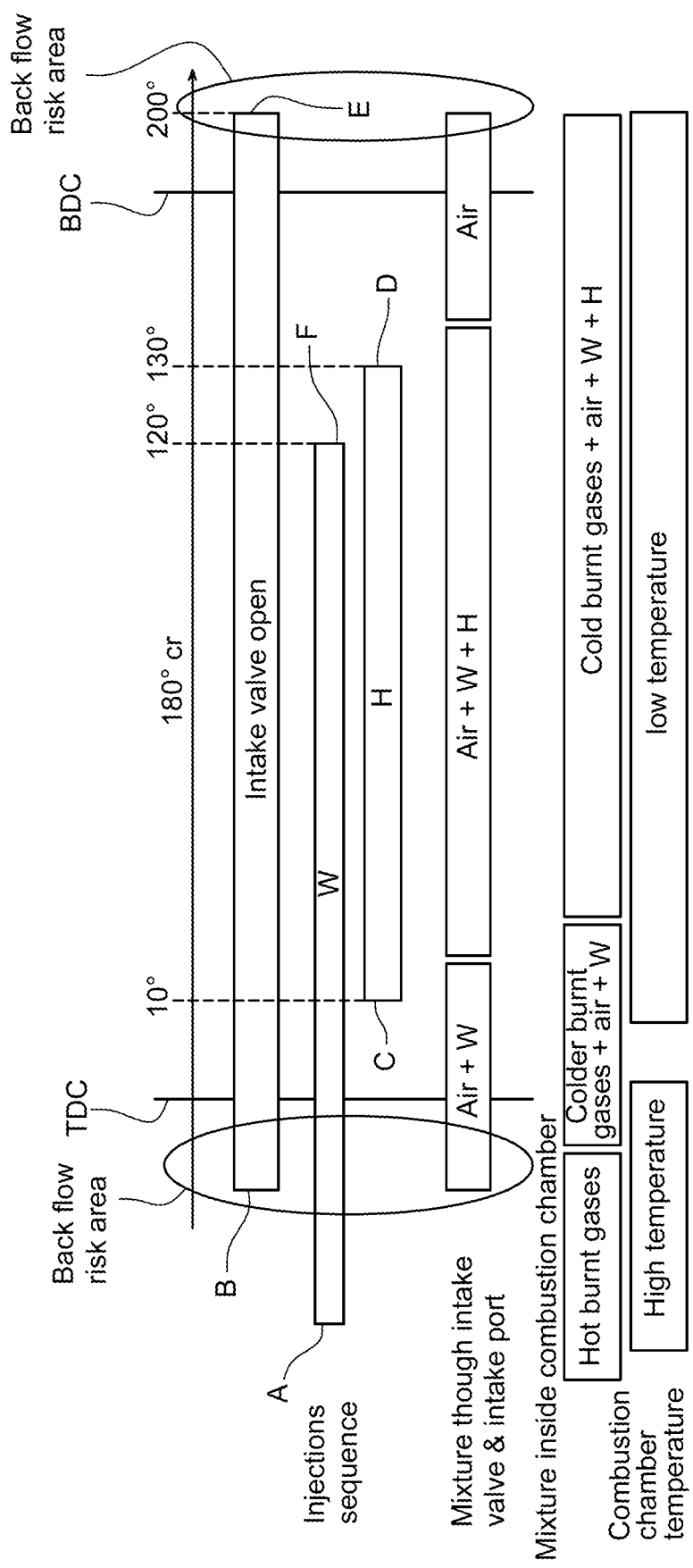
FIG. 2 is a diagram illustrating a method for controlling hydrogen combustion in the hydrogen internal combustion engine system of FIG. 1, according to the invention.

The piston 14 is slidably moving between a top dead center position TDC (FIG. 2) and a bottom dead center position BDC (FIG. 2).

The hydrogen internal combustion engine system 10 further comprises an intake port 18 running to the combustion chamber 12 via an intake valve 20. Moreover, the hydrogen internal combustion engine system 10 comprises an exhaust port 22 running from the combustion chamber 12 via an exhaust valve 24.

Hydrogen H is indirectly injected in the combustion chamber 12, through the intake port 18. In alternative, hydrogen H could be directly injected in the combustion chamber 12.

In order to control the combustion of hydrogen H, water W is indirectly injected in the combustion chamber 12, through the intake port 18. Indirect injection of water W enables to control the combustion of hydrogen H by lowering the temperature of the combustion gases in order to avoid back fire of combustion gases from the combustion chamber to the intake port.

More precisely, as illustrated in FIG. 2, the method for controlling hydrogen combustion comprises the step of injecting A water W before opening B of the intake valve 20 or at the same time as the opening B of the intake valve 20. Therefore, a mixture of air and water W is injected in the intake port 18. Water W enables to control the combustion of hydrogen H by lowering the temperature of combustion gases and avoiding back fire of combustion gases from the combustion chamber 12 to the intake port 18.

More precisely, water W can be injected when the piston 14 is between 0 and 40 crank angle degrees before opening B of the intake valve 20. For instance, water can be injected when the piston is 20 crank angle degrees before opening B of the intake valve 20.

Water W is injected in liquid phase.

The method further comprises a step of injecting C hydrogen H after opening B of the intake valve 20 and when the piston 14 is between 0 and 60 crank angle degrees, and for instance 10 crank angle degrees, after the top dead center position TDC. Therefore, hydrogen H is driven by water W and air running from the intake port 18 to the combustion chamber 12, and does not back flow into the intake port 18.

The method further comprises a step of stopping D hydrogen H injection when the piston 14 is between 0 and 100 crank angle degrees, and for instance 50 crank angle degrees, before the bottom dead center position BDC. This step ensures that there is no more hydrogen H in the intake port 18 when the combustion phase starts.

The step of opening B the intake valve 20 can be performed when the piston 14 is between 10 crank angle degrees before the top dead center position TDC and 40 crank angle degrees after the top dead center position TDC.

The method can further comprise a step of closing E the intake valve 20 when the piston 14 is between few degrees before or after the bottom dead center position BDC. More precisely, the step of closing E the intake valve 20 can be performed when the piston 14 is between 20 crank angle degrees before the bottom dead center position BDC and 60 crank angle degrees after the bottom dead center position BDC.

The method can further comprise a step of stopping F water W injection when the piston 14 is between few degrees before the bottom dead center position BDC. More precisely, the step of stopping F water W injection can be performed when the piston 14 is between 0 and 10 crank angle degrees before stopping D hydrogen H injection.

The step of injecting water W can comprise multi injection of water W. This allow to avoid droplet phenomenon.

The water W injection flow rate is according to longer time than hydrogen injection for relevant mass. Therefore, the temperature is cooled before hydrogen injection.

The step of injecting A water W is preferably longer than the step of injection C hydrogen H.

For instance, the step of injecting A water W last between 50 and 230 crank angle degrees.

The hydrogen H injection flow rate is according to available time for relevant mass.

For instance, the step of injecting C hydrogen H last between 40 and 180 crank angle degrees.

The step of injecting C hydrogen H can preferably last less than 100 crank angle degrees.

As illustrated in FIG. 2, inside intake port 18 there is a mixture of air and water W before opening B of the intake valve 20. Then, the intake valve 20 is open B, and then hydrogen H is injected into the intake port 18. Therefore a mixture of air, water W and hydrogen H is running from the intake port 18 to the combustion chamber 12. Then, injection of water W and hydrogen H are stopped (step D and F). Therefore air is running from the intake port 18 to the combustion chamber 12 in order to ensure that no hydrogen H remains into the intake port 18.

Moreover, hot burnt gases are inside the combustion chamber 12, before opening B of the intake valve 20. Then a mixture of colder burnt gases, air and water are inside the combustion chamber 12 after opening B of the intake valve 20. After injection C of hydrogen H, a mixture of cold burnt gases, air, water W and hydrogen H is inside the combustion chamber 12.

The temperature inside the combustion chamber 12 is higher before opening B of the intake valve 20 than after opening B of the intake valve 20.

It is to be understood that the present invention is not limited to the embodiments described above and illustrated in the drawings; rather, the skilled person will recognize that many changes and modifications may be made within the scope of the appended claims.

The invention claimed is:

1. A method for controlling hydrogen combustion in a hydrogen internal combustion engine system comprising a combustion chamber linked to an intake port via an intake valve, and linked to an exhaust port via an exhaust valve, the hydrogen internal combustion engine system further comprising a piston slidably moving between a top dead center position and a bottom dead center position, wherein the method comprises the steps of:

injecting water in liquid phase in the intake port when the piston is between 0 and 40 crank angle degrees before opening of the intake valve, injecting hydrogen after opening of the intake valve and when the piston is between 0 and 60 crank angle degrees after the top dead center position, stopping hydrogen injection when the piston is between 0 and 100 crank angle degrees before the bottom dead center position.

2. The method according to claim 1, wherein the step of opening the intake valve is performed when the piston is between 10 crank angle degrees before the top dead center position and 40 crank angle degrees after the top dead center position.

3. The method according to claim 1, further comprising the step of closing the intake valve when the piston is between 20 crank angle degrees before the bottom dead center position and 60 crank angle degrees after the bottom dead center position.

4. The method according to claim 1, further comprising the step of stopping water injection when the piston is between 0 and 10 crank angle degrees before stopping hydrogen injection.

5. The method according to claim 1, wherein the step of injecting water comprises multi injection of water.

6. The method according to claim 1, wherein the step of injecting water is longer than the step of injecting hydrogen.

7. The method according to claim 1, wherein the step of injecting hydrogen last less than 100 crank angle degrees.

8. The method according to claim 1, wherein hydrogen is indirectly injected in the combustion chamber through the intake port.

9. The method according to claim 1, wherein hydrogen is directly injected in the combustion chamber.

* * * * *